INVENTOR
Felice George Pasotti

Sept. 2, 1952 F. G. PASOTTI 2,609,306
METHOD AND APPARATUS FOR GLUE-SPOTTING CONTAINERS
Filed Feb. 24, 1948 4 Sheets-Sheet 3
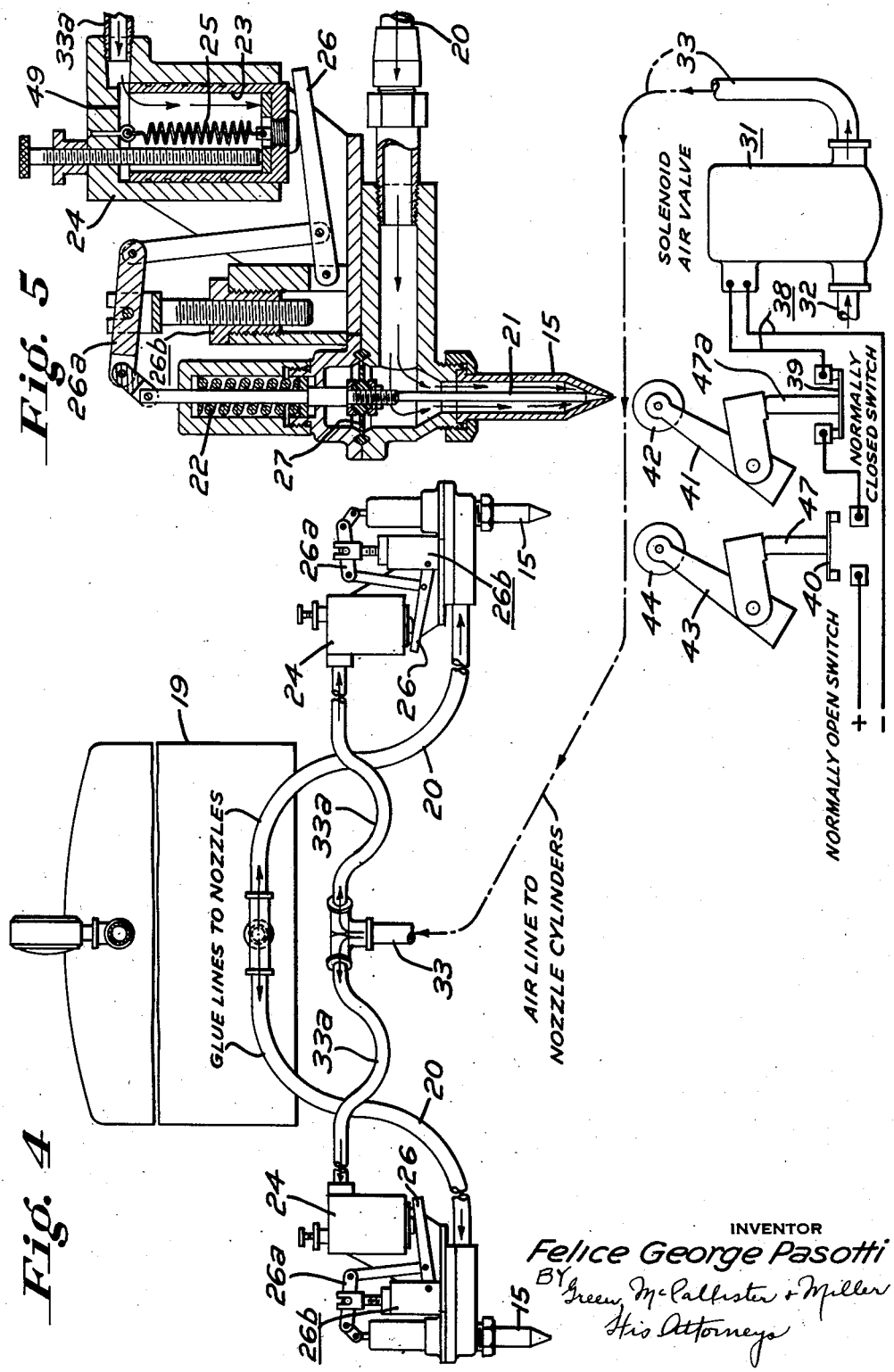
INVENTOR
Felice George Pasotti
BY Greer, McAllister & Miller
His Attorneys Sept. 2, 1952 F. G. PASOTTI 2,609,306
METHOD AND APPARATUS FOR GLUE-SPOTTING CONTAINERS
Filed Feb. 24, 1948 4 Sheets-Sheet 4

INVENTOR
Felice George Pasotti
BY Green, McCallister & Miller
His Attorneys

Patented Sept. 2, 1952

2,609,306

UNITED STATES PATENT OFFICE 2,609,306

METHOD AND APPARATUS FOR GLUE-SPOTTING CONTAINERS

Felice George Pasotti, Muncie, Ind., assignor to Ball Brothers Company, a corporation of Indiana Application February 24, 1948, Serial No. 10,410

8 Claims. (Cl. 117—37)

This invention relates to glue-spotting apparatus similar in some respects to apparatus disclosed in my application for patent Serial No. 788,720, which was filed November 28, 1947.

An object of the present invention is to produce glue-spotting procedure such that the container or article to be spotted is acted upon while in motion, and controls both the timing and the duration of the glue-spotting operation.

A further object is to produce glue-spotting apparatus which is actuated by the containers or articles to be spotted, and is responsive to the rate of movement of such articles in proportioning the amount of glue included in each spot delivered.

A further object is to produce simple and effective apparatus for glue-spotting containers and similar articles while the same are moved from one position to another, as for example, along a conveyor.

A further object is to produce glue-spotting apparatus which may be readily adjusted for the purpose of positioning the glue spot or spots placed on each container or similar article, and which may also be readily adjusted to vary the amount of glue included in each such spot.

A further object is to produce glue-spotting apparatus which is actuated by a moving container or similar article to be glue-spotted, and which is responsive in operation to the rate of movement of each such article.

A further object is to produce an electrically actuated glue-spotting apparatus which is responsive in operation to the movement of containers or similar articles to be spotted.

These and other objects which will be made more apparent throughout the further description of my invention, are obtained by means of the procedure herein outlined and by means of apparatus such as is herein illustrated and described. Throughout the further description of my invention and in the appended claims, I employ the term "container" to mean any article to be glue-spotted by apparatus embodying my invention.

In the drawings Figure 1 is an end elevation of apparatus embodying my invention. Figure 2 is a fragmental sectional view along the line II—II of Figure 1, and discloses a conveyor for containers shown in association with two control devices forming a detail of a control mechanism which constitutes a part of my invention.

Figure 4 is a diagrammatic view of glue-spotting nozzles shown in association with a glue delivery tank and also a diagrammatic representation of a control mechanism such as may be employed in controlling the operation of a glue-spotting mechanism such as is illustrated in Figure 5.

Figure 5 is a sectional view of a glue-spotting nozzle and the actuating mechanism thereof.

Figure 1:
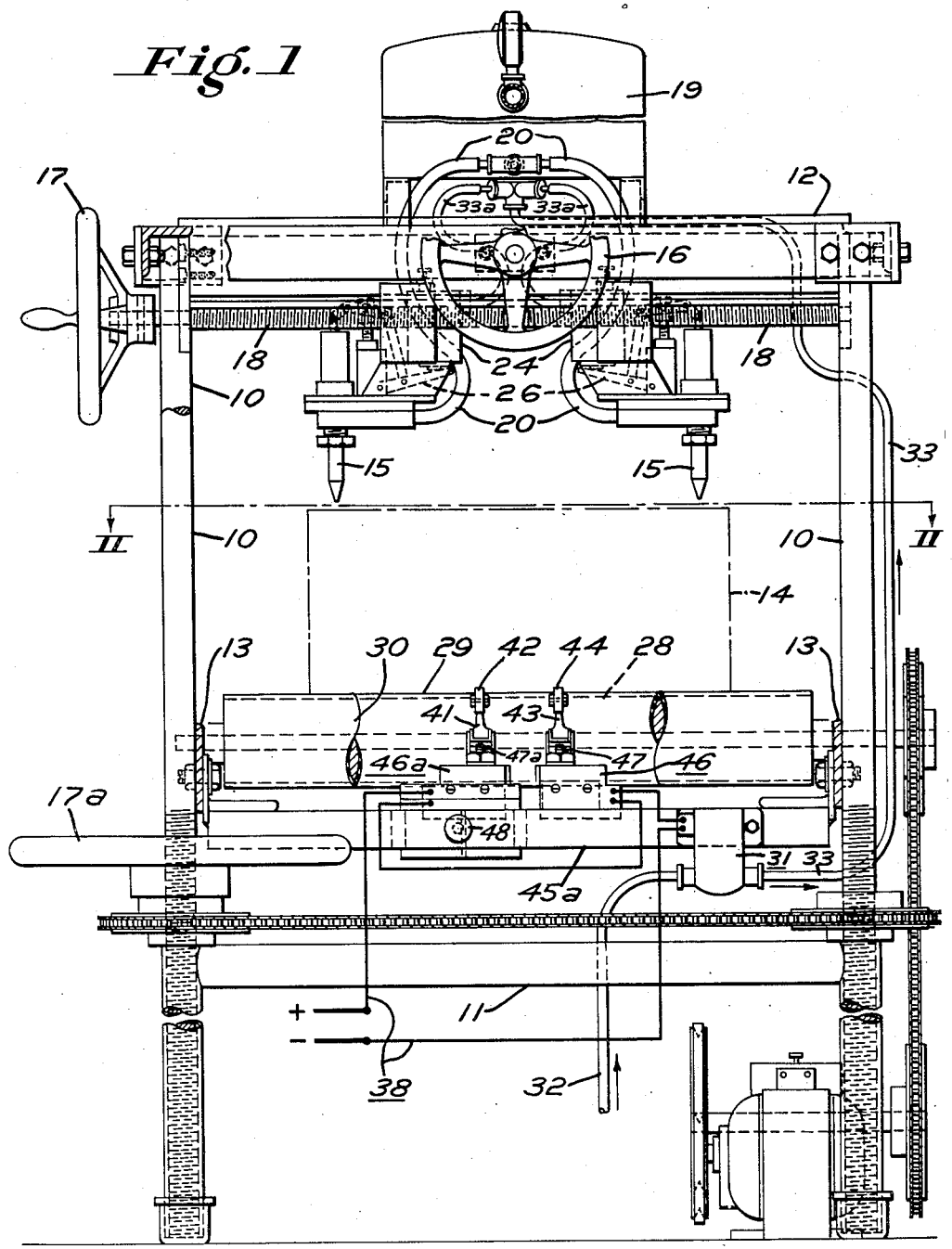

The glue-spotting apparatus, illustrated as an embodiment of my invention, includes means for controlling the movement of each container so that it is moving at a predetermined speed as it approaches and moves into operative relationship with the glue-spotting mechanism. The apparatus also includes a control mechanism which functions to control the operation of the glue-spotting mechanism. The control mechanism includes two control devices each of which is adapted to be engaged and actuated by containers during the controlled movement of the same. The functioning of the control devices is such that the glue-spotting mechanism is responsive to the movement of each container while its movement is being controlled. The arrangement is also such that the controlled movement of each container not only fixes the time that the glue-spotting mechanism operates to deliver glue to a surface thereof, but also controls the amount of glue so delivered.

The glue-spotting mechanism may be such as to deliver one or more spots of glue to the surface of each container subjected to its operation. In the apparatus illustrated the glue-spotting mechanism is adapted to deliver four spots of glue onto each container. For this reason, the apparatus is illustrated as including four glue-delivery nozzles and the control mechanism is operatively connected to the actuating mechanism of each such nozzle.

Each control device forming a part of the control mechanism, is independently adjustable along the line traveled by the containers during their controlled movement. In this way the position of each container, at the instant it engages each control device, may be preliminarily established. The control devices are so arranged that the first to be engaged by a container, occasions the operation of the glue-spotting mechanism and consequently the delivery of glue onto a surface of the engaging container. When the other device is engaged and actuated by the container it controls the glue-spotting mechanism to shut off or stop the delivery of glue. Thus, the relative positions of the two devices along the line of controlled travel of the containers not only times the delivery of glue to each container, but also proportions the amount of glue so delivered.

The procedure constituting a part of my invention, includes, the steps of propelling each container to be spotted, at a predetermined speed toward the glue-spotting position. It also includes the step of continuing the movement of each container beyond the glue-spotting position at an increased rate of speed. At least one spot of glue is delivered to each container while it is moving at the fixed or predetermined rate at which it approaches the glue-spotting position. The delivery of glue to each such container is timed by the position of the container during such movement. The flow of glue onto each container is stopped during such movement of the container and again the timing of the operation is dependent upon the position of the moving container. As previously indicated, after each container has been glue-spotted it is moved away from the glue-spotting position at a rate of speed in excess of that at which it approaches that position, thus assuring the free and unhampered movement of each container toward the glue-spotting position and while it is subjected to the glue-spotting operation.

Figure 2:
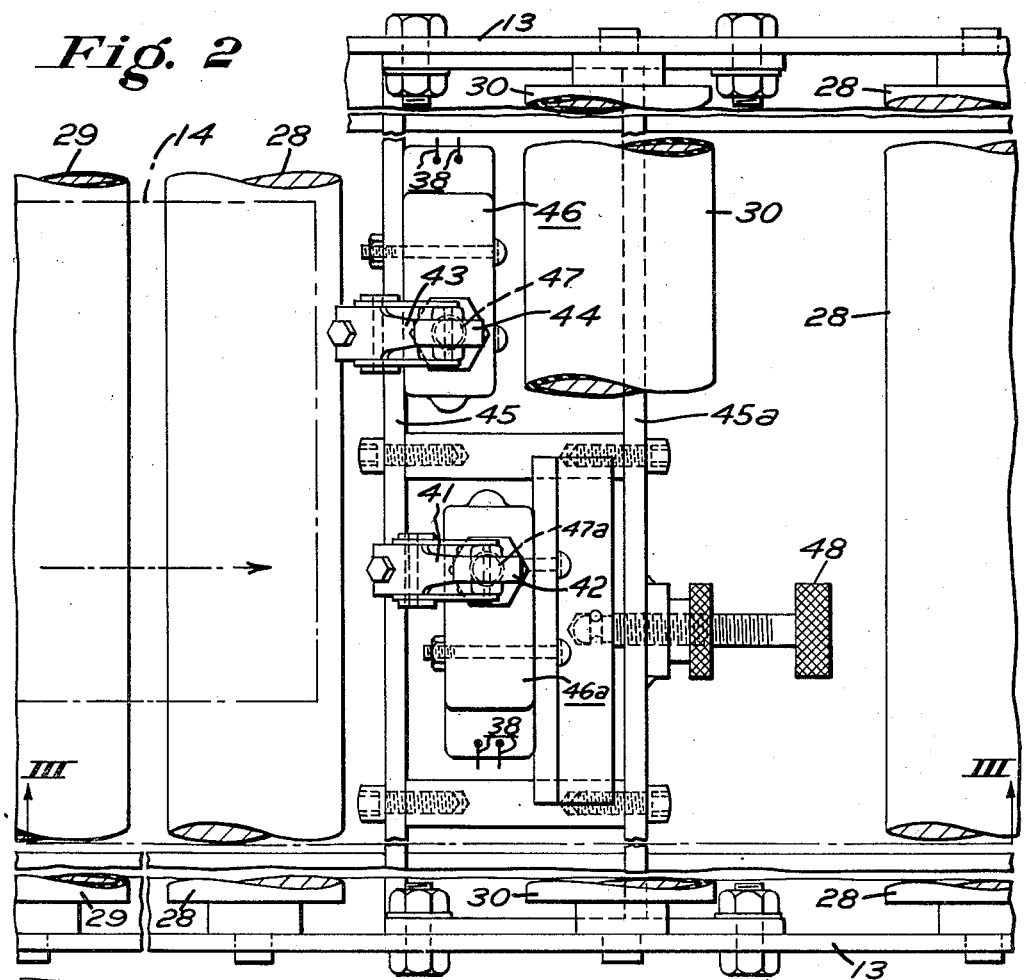
Figure 3:
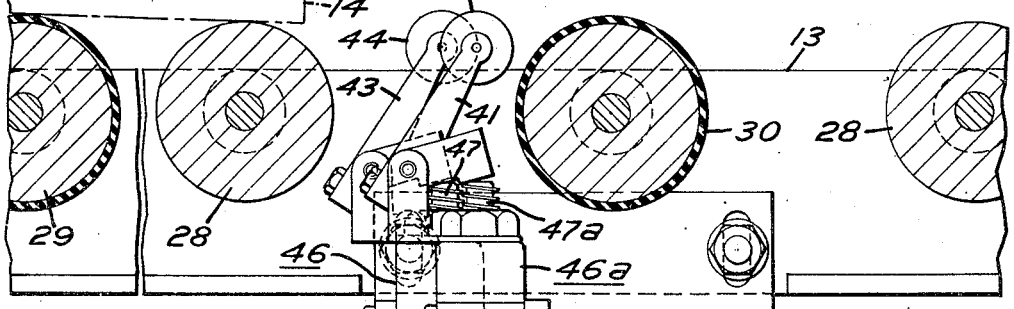
Figure 3 is a fragmental sectional view along the line III—III of Figure 2.

Referring to the drawings and particularly Figures 1, 2 and 3, the apparatus illustrated includes a frame portion shown as consisting of up-rights 10, a bottom structure 11 and a top structure 12. The frame is similar in structural details to the frame disclosed in my previously mentioned application and, for that reason, I neither describe nor illustrate all of its structural details. It will, however, be noted that a conveyor for containers is supported by the frame below the top structure 12 and, as illustrated, consists of side members 13 and container-supporting rollers which are rotatably mounted on the side members and which are adapted to support containers, such as the container 14 illustrated by dot-dash lines in Figure 1, as they move toward and away from the glue-spotting position.

The glue-spotting mechanism forming a part of the apparatus, is shown as mounted on the upper portion 12 of the frame. The apparatus includes two sets of glue-delivery nozzles 15. Each set includes two nozzles and is adjustable longitudinally of the frame, i. e., to different positions along a line parallel to the longitudinal axis of the conveyor. Each nozzle of each pair is independently adjustable in that it is capable of being moved transversely of the frame or to different positions laterally of the longitudinal axis of the conveyor. The first mentioned adjustment is accomplished by the hand wheel 16 and is provided for the purpose of adjusting the glue-spotting mechanisms to containers of different lengths. The second mentioned adjustment is accomplished by means of two hand wheels 17 each of which actuates a double ended screw 18. This adjustment is for the purpose of varying the position of the nozzles to take care of containers of different widths. The top structure 12 of the frame is capable of being raised and lowered by means of a hand wheel 17a, to adjust the positions of the nozzles for containers of different thickness.

The mechanism also includes a glue receptacle or tank 19, which is supported on the top portion 12 of the frame and, as clearly shown, in Figures 4 and 5 communicates with each nozzle 15 through a separate glue-supply pipe 20. The glue-delivery nozzles included in the glue-spotting mechanism may be of any suitable structure. The structural details of the nozzles illustrated in the drawings form no part of the present invention, except in so far as they cooperate with or respond to adjustments, controls and control mechanisms forming a part of my improved glue-spotting apparatus. As illustrated, each nozzle is provided with a needle valve 21 which is arranged to control the flow of glue through the nozzle and onto a container while the container is moving along the conveyor. The needle valve is normally held in a nozzle-closing position by means of a coil spring 22. It is moved to a nozzle opening, or glue delivery position, in opposition to the pressure of said spring 22, by means of a pressure actuated plunger 23 which is located within a cylinder 24 and is normally held in the retracted position, with relation to the cylinder by means of a coiled suspension spring 25. As indicated in Figure 5 the plunger 23 actuates the needle valve 21 to open the nozzle, through the agency of a system of links and levers which includes a lever 26, one end of which is engaged by the plunger 23 and a lever 26a which is shown as of the walking beam type, and is fulcrumed on an adjustable standard 26b.

The glue in the tank 19 may be conveniently maintained under pressure, such as air pressure, and as stated, glue is delivered to each nozzle 15 through a separate delivery pipe or duct 20 which is flexible so as to accommodate adjustments of the nozzles. For the sake of clearness of illustration, it is noted that the nozzle illustrated in Figure 5 is provided with a flexible diaphragm 27 which surrounds the stem of the needle valve 15, and is arranged to prevent leakage of glue into the housing of the coil spring 22.

As stated, the upper portion 12 of the frame is capable of being raised and lowered, thus raising and lowering the nozzles to accommodate containers of different thickness. This is accomplished in the apparatus illustrated by forming the side members 10 in two parts with one part telescoped into the other and adjustable relatively thereto. The adjustment is accomplished by the hand wheel 17a.

Figure 6:
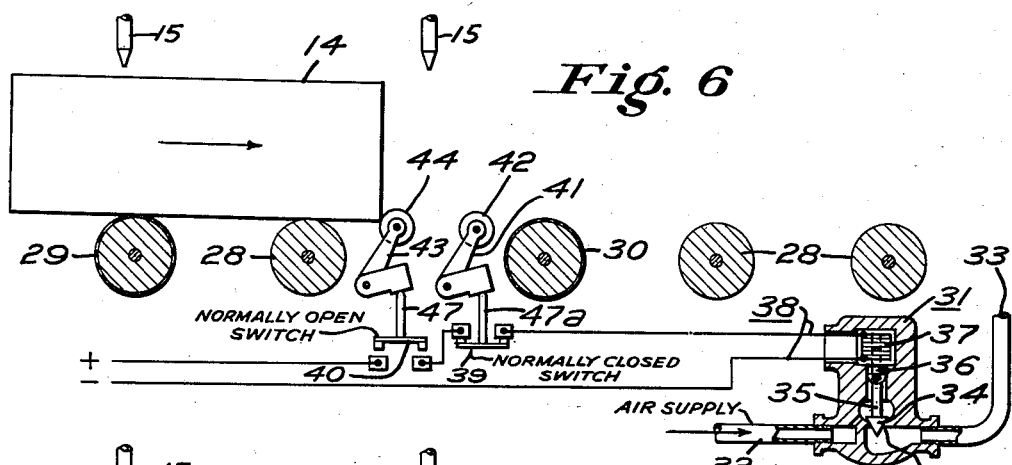
Figure 6 is a diagrammatic representation of a portion of a conveyor, such as is employed in connection with my invention, shown as supporting a container and in association with diagrammatic illustration of glue-spotting nozzles and the control devices forming a part of the glue-spotting mechanism illustrated as an embodiment of my invention.
Figure 7:
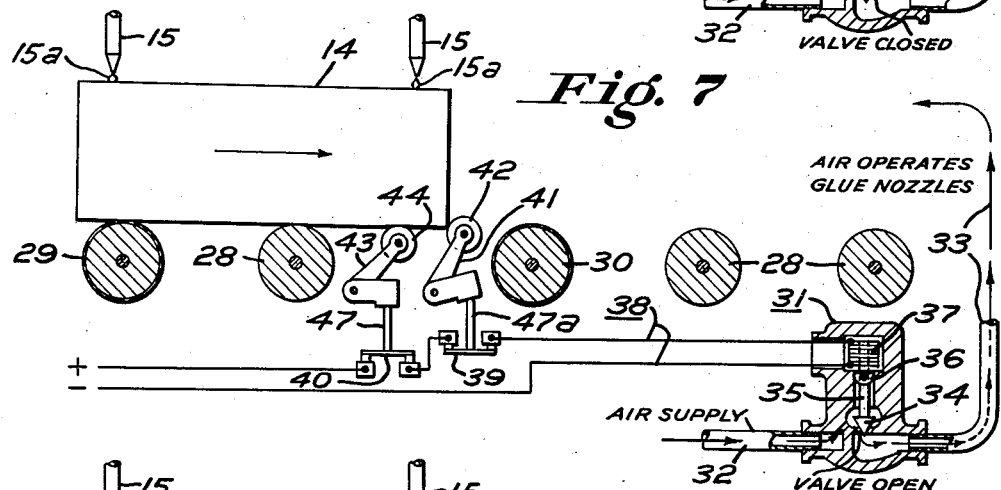
Figure 7 is a view similar to Figure 6, showing the container so positioned on the conveyor that the control devices are in the glue-spotting position.
Figure 8:
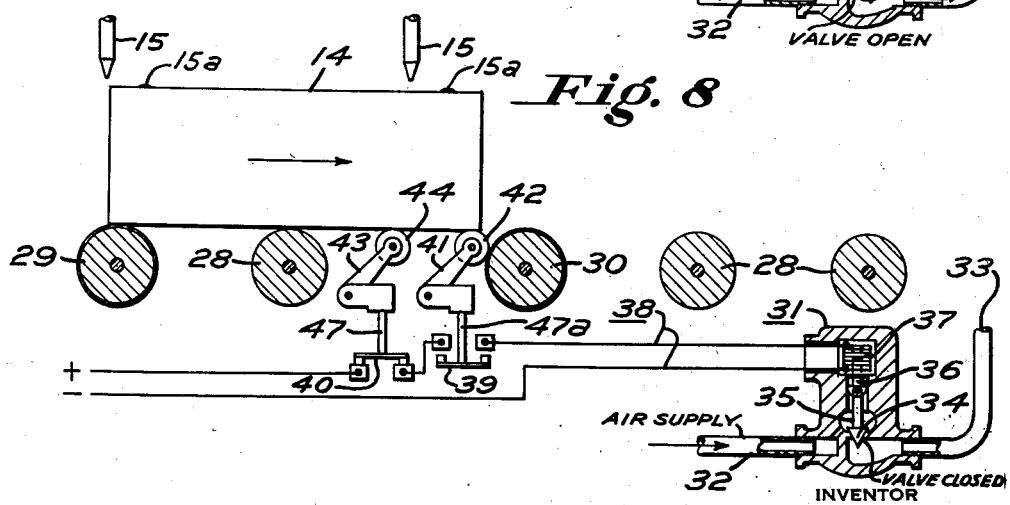
Figure 8 is a view corresponding to each of Figures 6 and 7, but shows the container moved to such a position on the conveyor that the control devices cooperate to shut off delivery of glue through the glue-delivery nozzles.

A reference to Figures 1, 2 and 3 will disclose that the conveyor forming a part of the apparatus illustrated, is of the roller type. This is also indicated by the diagrammatic illustration of Figures 6, 7 and 8. Idler rollers 28 are rotatively mounted on the side members 13 so that containers moving along the conveyor are supported by them. The conveyor also includes two driven rollers 29 and 30. These rollers are rotatively mounted on the side members, are spaced one from the other and extend parallel to the idler rollers 28. Each of the driven rollers is so surfaced, with rubber or some similar composition, as to insure a frictional grip between it and each container on the conveyor engaged by it. This may be accomplished by providing the cylindrical surfaces of the rolls 29 and 30 with circumferential bands of material which, in effect, grip the surface of each container.

The roller 29 is located on the incoming side of the conveyor and is so positioned that when engaged by a container it moves the same to the glue-spotting position on the conveyor at a predetermined or fixed rate of travel. For this reason, the roller 29 is driven at a predetermined, uniform speed. The roller 30 is located on the out-going side of the conveyor and is driven at a speed greater than that of the roller 29, and on engaging a container moving along the conveyor impels it along the conveyor at a rate greater than the impelling rate of the roller 29.

The operation of the glue-spotting mechanism is controlled by each container as it moves along the conveyor, with the result that each nozzle 15 of the mechanism delivers a spot of glue 15a onto the container, initiating the operation of the mechanism, as that container moves along the conveyors. To this end the control mechanism for the glue-spotting mechanism includes control devices which are actuated by containers moving along the conveyor.

As shown in Figures 4 and 6 to 8, the control mechanism includes an electro magnetically actuated valve 31 which controls the delivery of air under pressure to the pneumatic actuating devices for each of the glue-delivery nozzles 15. The valve mechanism 31 controls the delivery of air under pressure from a supply pipe 32 to a delivery pipe 33 which communicates, through suitable branch pipes 33a, with each of the cylinders 24 which are associated with and surround the valve actuating plungers 23. The valve mechanism 31 (Figures 6–8) includes a valve disk 34 which is located within a valve casing and is normally held in the closed position by the pressure of the air delivered through the supply pipe 32. The stem 35 of this valve is operatively coupled to the armature 36 of a solenoid coil 37, which is located in an electric circuit 38. Two control switches 39 and 40, are located in series in the circuit so that both must be closed to pass current to the coil 37. The switch 39 is so arranged with relation to its actuating device that it is normally closed. On the other hand, the switch 40 is so arranged with relation to its actuating device that it is normally open. Under such conditions, the closing of the switch 40 delivers energizing current to the coil 37, provided the switch 39 is in its normal or closed position.

The actuating devices for the switches 39 and 40 are in fact control devices forming a part of the control mechanism, and are so positioned that they are actuated by containers moving along the conveyor under the control of the driven roller 29, i. e., conveyors approaching the glue-spotting position and moving at a controlled rate.

The actuating device for the switch 39 is shown in the form of a pivotably mounted bell crank lever 41, one arm of which is shown in actuating engagement with the operating arm of the switch 39 and the other arm of which is provided at its end with a roller 42. The actuating device for the switch 40 is shown as a bell crank lever 43 which like the lever 41, is provided at its upper end with a roller, designated by the reference numeral 44. One arm of the lever 43 is in actuating engagement with the actuating arm of the switch 40.

These actuating devices for the two switches 39 and 40, the solenoid 36 and valve 31, constitute the control device for the glue-delivery mechanism. As shown the two lever arms 41 and 43 are so located with relation to the supporting rolls of the conveyor that the rollers carried by them project upwardly between the container support rolls of the conveyor and are located in a position such that they are engaged by each container as it moves along the conveyor in response to the impelling force imparted to it by the driven roller 29. As shown in the drawings, the lever 43 is located ahead of the lever 41 with relation to the direction of travel of containers along the conveyor. Its roller 44 is, therefore, engaged first by an oncoming container 14, and as it is depressed by the container the bell crank 43 moves to close the normally open switch 40. The switch 39 being closed, the closing of the switch 40 energizes the solenoid 37, opens the valve 35, delivers air under pressure to each of the cylinders 24, and thus, actuates each of the plungers 23 to lift a nozzle control valve 21, and thus deliver glue through the associated nozzle 15. As the container 14 continues its forward movement it engages the roller 42 and in depressing that roller, actuates the bell crank lever 41 to open the normally closed switch 39, thus opening the circuit 38 and de-energizing the coil 37. As soon as the coil 37 is de-energized the air pressure entering the valve 31 through the supply pipe 32 is effective in moving the valve disk 34 to the valve closing position, thus shutting off the supply of actuating air pressure to the various plungers 23. In other words, de-energizing of the coil 37 occasions the closing of each of the needle valves 21 associated with the various nozzles 15, and therefore shuts off the flow of glue from each such nozzle onto the upper surface of the moving container 14.

The energizing circuit of the coil 37 is held open as long as the bell crank 41 is held in the depressed position by a container 14 moving along the conveyor. As such container continues its motion it first moves out of contact with the roller 44 and thus permits the lever 43 to move upwardly and occasions the opening of the normally open switch 40. In this way, the circuit 38 is opened by the switch 40 before the container 14 moves off of the roller 42, thus permitting switch 39 to move to its normal or circuit closing position.

With this arrangement of the control devices, the glue-spotting mechanism is momentarily actuated by each container moving along the conveyor. Glue is delivered through each of the nozzles 15 during the period between the closing of the switch 40 and the opening of the switch 39, with the result that each nozzle 15 delivers a larger or smaller amount of glue, depending upon the period during which the needle valves 21 are held open by their respective actuating plungers 23. This in turn depends on the relative positions of the rollers 44 and 43 along the line of travel of the containers 14 and the rate at which the containers are impelled by the driven roll 29.

In Figures 2 and 3 the switch 40 and its actuating lever are shown as a unitary structure secured to a cross brace 45 of the roller conveyor. While the details of this unitary structure form no part of the present invention, it is noted that the switch 40 is normally held in the open position by a coiled spring which also functions to turn the lever 43 to a position such that its container-engaging roller 44 normally projects upwardly into the path of travel of containers moving along the conveyor and approaching the glue-spotting position. As shown, the lever 43 is pivotably mounted on the casing 46 of the switch 40, and is so arranged that its switch-actuating arm rests in contact with the actuating finger 47 of the switch 40. In the drawings the switch 39 is shown as carried by a frame portion which is supported by the cross brace 45 and a cross brace 45a of the conveyor structure. Here again structural details of the unitary structure are not of major importance in connection with the present invention, but it is noted that the bell crank lever 41 is pivotably mounted on the casing which forms a part of the switch structure, and that the switch-actuating arm of the lever rests in contact with the actuating finger 47a of the switch 39.

In the illustrated embodiment the casing 46a is capable of being moved along its carrying frame so as to adjust the position of the roller 42 with relation to that of the roller 44. An adjusting screw 48 is provided for this purpose, and as indicated by the drawings, it is capable of moving the casing 46a to different positions along the line of travel of containers 14 approaching the glue-spotting position. In this way the period during which the glue-spotting nozzles are open, may be controlled with reasonable accuracy. That is to say, the interval between the closing of the switch 40 and the opening of the switch 39 by an on-coming container, and the closing of the switch 39 by the same container, may be accurately adjusted assuming that the rate of travel of the container is maintained constant.

The time of operation of the glue-spotting mechanism will, of course, depend upon the position of the control devices along the conveyor and such lag as may be encountered in the operation of the pressure actuated plungers 23 after the switches 40 and 39 operate first to close the circuit 38 and then to open that circuit. As previously noted the electrically actuated valve 31 delivers fluid under pressure to each cylinder 24 associated with each nozzle 15, thus opening the nozzle valves 21. The opening of the circuit 38 causes the valve 31 to shut off the supply of air to each such cylinder and the atmospheric vent 49 in the head thereof permits the combined action of the springs 22 and 25 to close the associated nozzle valves 21.

While I have illustrated and described but one embodiment of my invention, it will be apparent to those skilled in the art that various changes, additions, omissions, and substitutions may be made in the apparatus illustrated and in the procedure disclosed without departing from the spirit and scope of my invention as defined by the appended claims.

What I claim is:

1. A method of glue-spotting a plurality of containers which consists in successively moving each container along a predetermined path at a predetermined rate, initiating the delivery of glue onto a surface of each container as it arrives at a predetermined position along such path; continuing such delivery as the receiving container continues its movement along such path; then shutting off the delivery as such container arrives at a second predetermined position along said path, then increasing the rate of movement of the glue spotted container; and varying the amount of glue delivered to successive containers by varying the time of travel of each container along said path between the initiation of such flow and the cessation thereof.

2. In a glue-spotting apparatus, a glue-spotting nozzle; a valve for controlling the delivery of glue therefrom; actuating means for said valve; impelling means for delivering successive containers up to and beyond a glue-spotting position relatively to said nozzle; an electrical control mechanism for said valve actuating means including a control circuit; a normally open switch and a normally closed switch located in series in said circuit; and a control device for each such switch projecting into the line of travel of containers impelled by said impelling means.

3. In a glue-spotting apparatus, a conveyor; a glue-spotting mechanism having a valve for controlling the delivery of glue therethrough; an electro-pneumatic means for actuating said valve; a control circuit for said means; a normally closed switch and a normally open switch located within said circuit; and separate means actuated by each successive container moving along said conveyor for successively actuating said switches to first close and then open said circuit.

4. A glue-spotting apparatus, comprising a glue-spotting mechanism; impelling means for moving a succession of containers at a substantially fixed rate along an established path up to said mechanism; a control device actuated by each successive container as it is impelled by said impelling means to motivate said mechanism to initiate a delivery of glue; a second control device spaced along such path from said first mentioned device and actuated by each successive container moving along said path to motivate said mechanism to stop the delivery of glue; and a second impelling means engaging each successive container traversing such path and accelerating the movement thereof while it is in engagement with said second control device.

5. A method of glue-spotting a plurality of containers, which consists in successively moving each container along a predetermined path at a substantially uniform rate; initiating a delivery of glue onto the surface of each such container as it arrives at a predetermined position along said path; continuing such delivery as the receiving container continues its movement along said path; shutting off the delivery as such container arrives at a second predetermined position along said path; then increasing the rate of movement of the glue-spotted container along said path; and varying the amount of glue delivered to successive containers by varying the distance traversed by each such container along said path while glue is delivered to it.

6. In a glue-spotting apparatus, a glue-spotting nozzle; a valve for controlling the delivery of glue through said nozzle; apparatus for controlling the operation of said valve; impelling means for moving successive containers up to a glue-spotting position with relation to said nozzle at a fixed rate of movement; a second impelling means for moving successive containers away from the glue-spotting position at an increased rate of movement; and, two control devices located between said impelling means, each extending into the path of travel of containers moved by the first mentioned impelling means and moving toward said second impelling means, one such device controlling said apparatus to open said valve and the other controlling said apparatus to close said valve.

7. In combination with a glue-spotting nozzle, a mechanism for controlling the delivery of glue therethrough; impelling means for moving a succession of containers at a substantially fixed rate along an established path up to a glue-spotting position with relation to said nozzle; a second impelling means spaced from said first impelling means and engaging each successive container traversing said path and accelerating the movement thereof away from the glue-spotting position; a control device actuated by each successive container, moving toward said glue-spotting position, to motivate said mechanism to initiate a delivery of glue through said nozzle and a second control device actuated by each successive container, moving along said path, to motivate said mechanism to stop the delivery of glue; both said control devices being located between said impelling means, and being adjustable relatively to each other along said path.

8. In combination with a glue-spotting nozzle, a mechanism for controlling the delivery of glue through said nozzle; impelling means for moving a succession of containers at a substantially fixed rate along an established path up to a glue-spotting position with relation to said nozzle; a control device actuated by each successive container, as it is impelled by said means, to motivate said mechanism to initiate a delivery of glue through said nozzle; a second control device spaced along said path from said first mentioned device and actuated by each successive container, as it is impelled by said means, to motivate said mechanism to stop the delivery of glue through said nozzle and a second impelling means spaced from the first mentioned impelling means and engaging each successive container traversing said path while the same is in engagement with said second control device and increasing the rate of movement of the engaged container over that of the next successive container approaching the glue-spotting position.

FELICE GEORGE PASOTTI.

REFERENCES CITED

The following references are of record in the file of this patent:

UNITED STATES PATENTS

| Number | Name | Date |
|---|---|---|
| 1,895,617 | Fay | Jan. 31, 1933 |
| 2,072,948 | Geffs | Mar. 9, 1937 |
| 2,114,723 | Paasche | Apr. 19, 1938 |
| 2,252,432 | Klammt | Aug. 12, 1941 |
| 2,274,432 | Repsher et al. | Feb. 24, 1942 |
| 2,317,446 | Dennis | Apr. 27, 1943 |
| 2,375,305 | Kimball et al. | May 8, 1945 |
| 2,437,198 | Kay | Mar. 2, 1948 |